Feb. 20, 1940.         D. V. STELLIN         2,191,101
                        LOCK WASHER
                  Filed Jan. 23, 1939       5 Sheets-Sheet 1

INVENTOR.
Domnic V. Stellin
BY Samuel Weisman
ATTORNEY.

Feb. 20, 1940.   D. V. STELLIN   2,191,101
LOCK WASHER
Filed Jan. 23, 1939   5 Sheets-Sheet 2
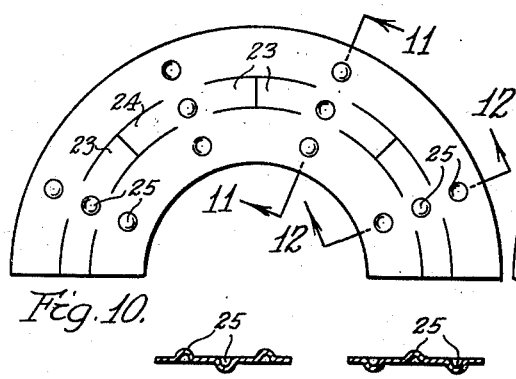
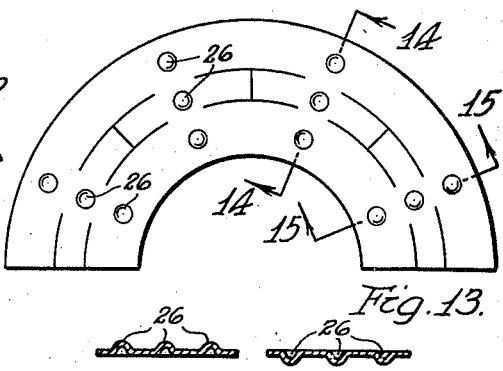
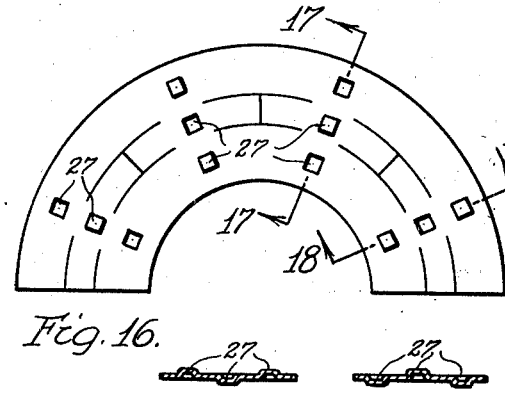
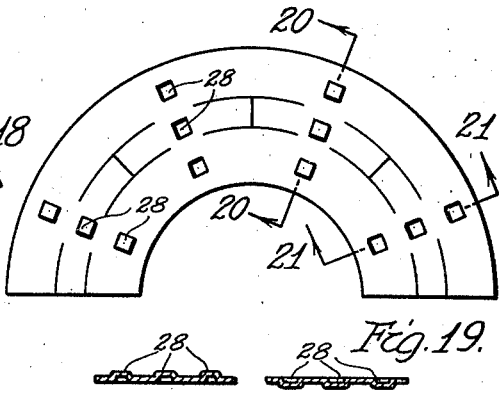
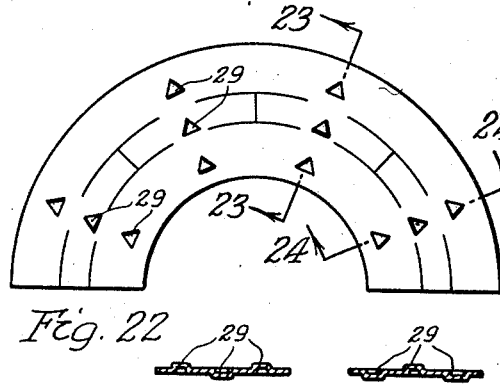
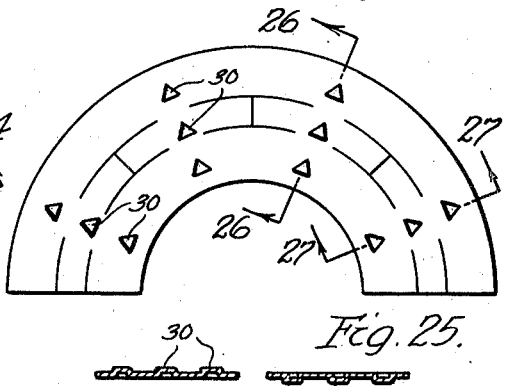
INVENTOR.
Domnic V. Stellin
BY Samuel Weisman
ATTORNEY.

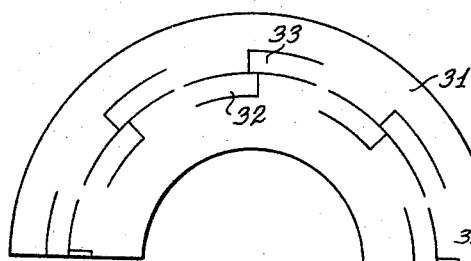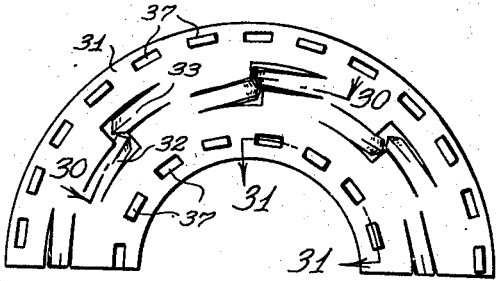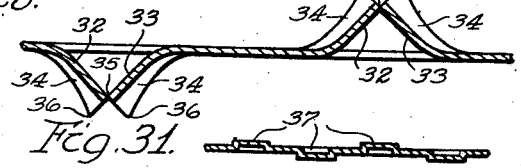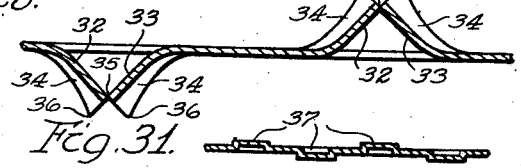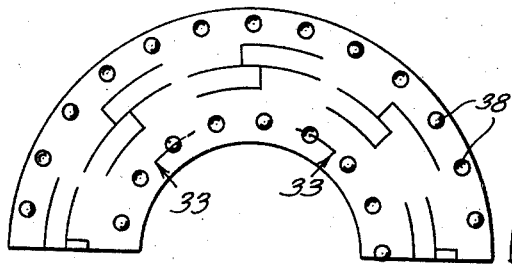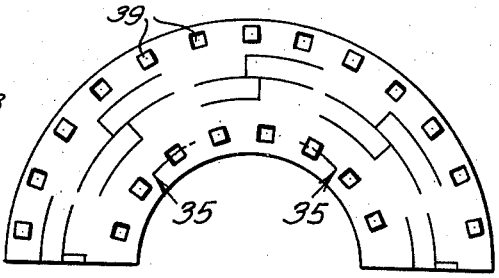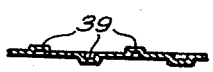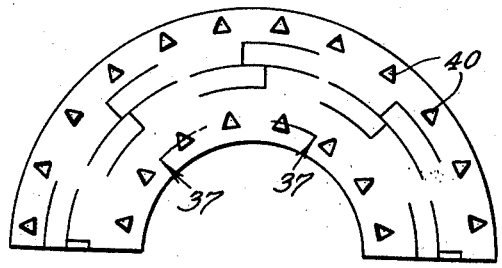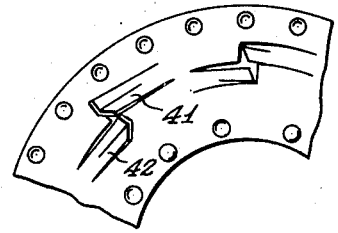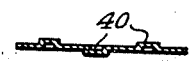

Feb. 20, 1940.   D. V. STELLIN   2,191,101
LOCK WASHER
Filed Jan. 23, 1939   5 Sheets-Sheet 4
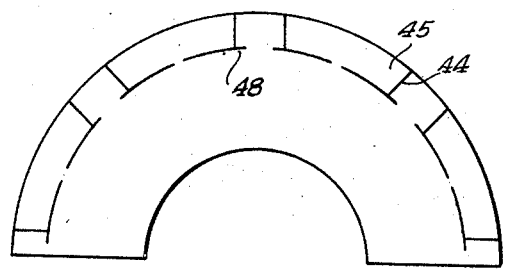
Fig. 39.
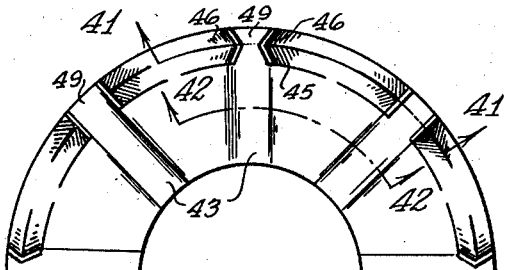
Fig. 40.
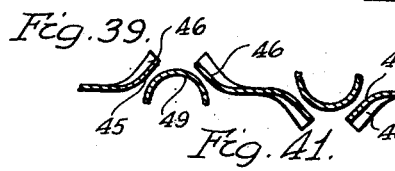
Fig. 41.
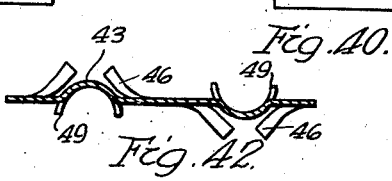
Fig. 42.
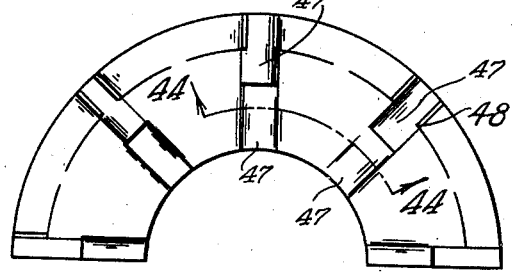
Fig. 43.
Fig. 44.
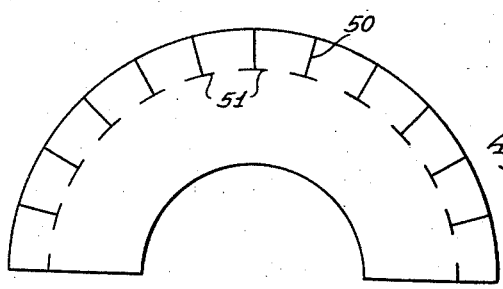
Fig. 45.
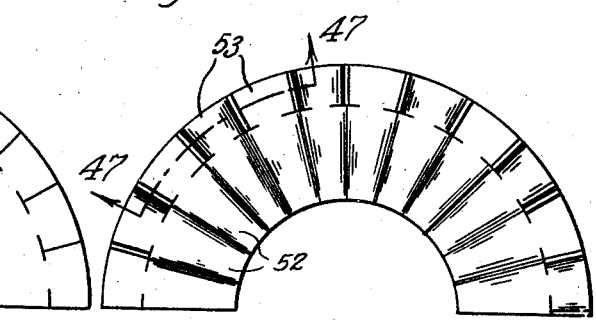
Fig. 46.
Fig. 47.
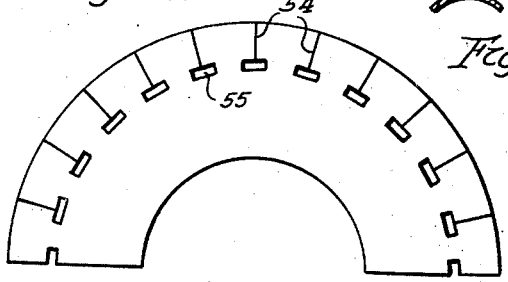
Fig. 48.
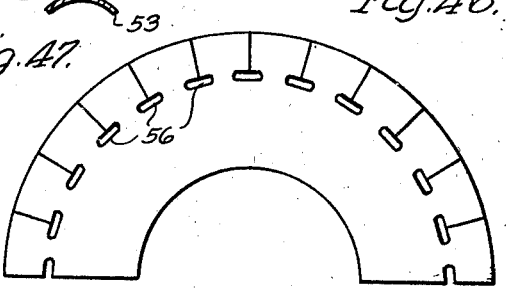
Fig. 49.
INVENTOR.
Domnic V. Stellin
BY Samuel Weisman
ATTORNEY.

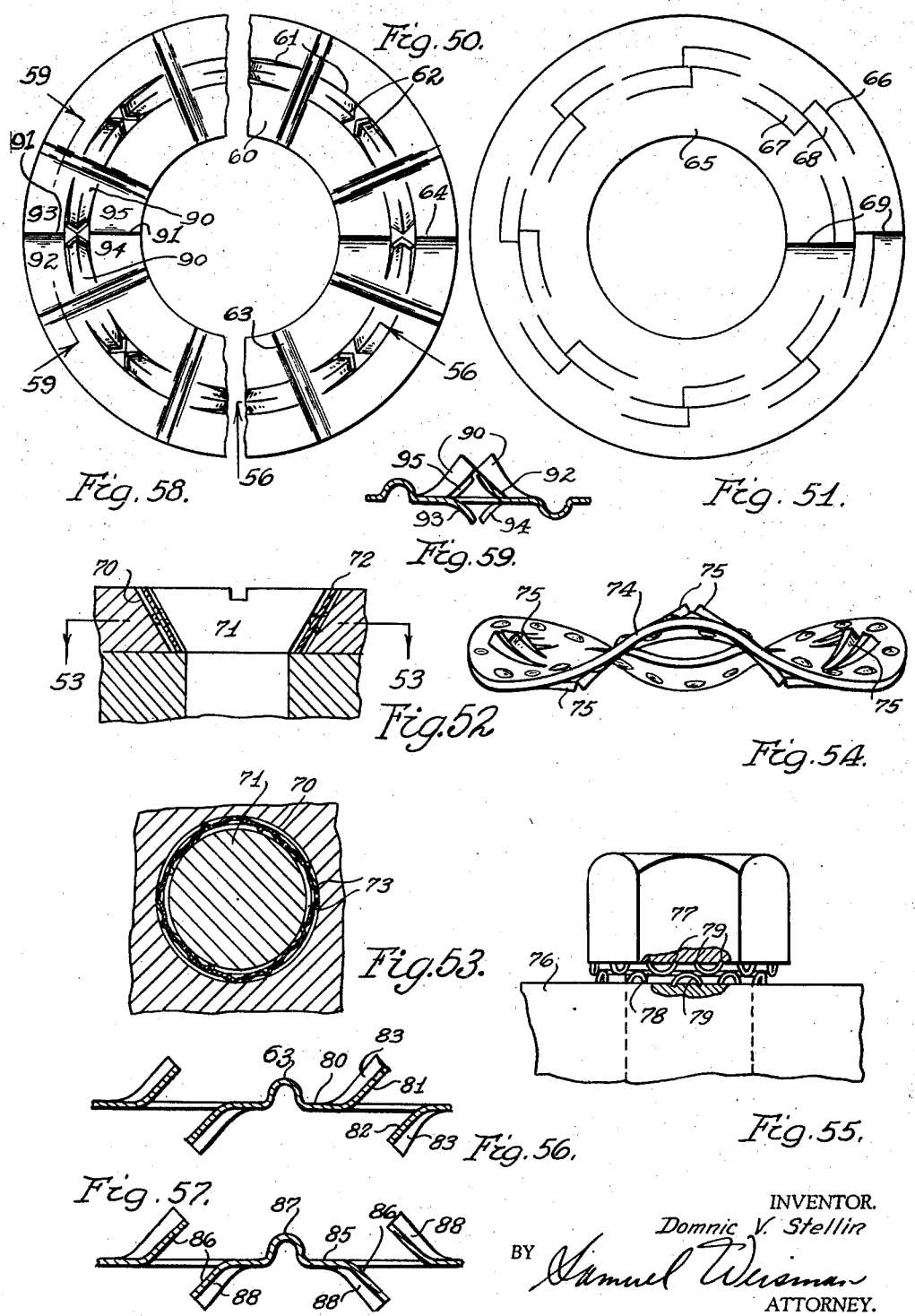

Patented Feb. 20, 1940

2,191,101

UNITED STATES PATENT OFFICE 2,191,101

LOCK WASHER

Domnic V. Stellin, Detroit, Mich.

Application January 23, 1939, Serial No. 252,301

20 Claims. (Cl. 151—35)

The present invention pertains to lock washers, and the principal object is to provide a lock washer that is equally serviceable for right-hand and left-hand threads.

The washers now available on the market are suitable only for right-hand threads. If used for left-hand threads, they have no tightening action on the threaded member and afford no resistance to the loosening of the latter. This is due to the fact that a left-handed threaded member in working loose turns in the direction in which the locking points extend from the body of the washer and therefore merely ride over them. A washer suitable for left-hand threads would require a different set of dies and other forming apparatus in all sizes in which such washers are to be made. Further, there would be the additional expense of separate handling, storage space and attention required in using two kinds of washers. The latter requirement would be especially undesirable on production assembly lines where little time is allowed each worker to perform his specific operation.

The present invention overcomes these difficulties by providing a washer that is equally suitable for right- and left-hand threads. In the accomplishment of this object, locking elements are formed to extend in both directions from the plane or body of the washer blank with reference to a given direction of rotation or travel around the center of the washer. Locking elements extending in both directions are preferably struck from each surface of the blank, although the broad object of the invention is realized by striking the locking elements on one side in one direction and on the other side in the opposite direction, with reference to a given direction of rotation.

In the preferred embodiments of the invention, where locking elements extend in opposite directions from each surface of the blank, they are caused to overlap one another at their free points, one resting on the other. These elements may be in the form of fingers or tongues. In this overlapping relation, they prevent added resistance to being entirely crushed or flattened out by the clamping element such as a nut or the head of a screw, bolt, or stud. The crushing or flattening is also resisted by protuberances such as dents or radial or annular ridges formed in one or both surfaces of the blank.

A further object of my invention is to provide a lock washer whose locking action involves the entire washer. The aforementioned protuberances or raised portions throw the body of the washer out of plane, and this plane is restored only when the washer is placed under pressure in actual use. Consequently the clamped washer body is under tension which contributes to the locking action of the locking elements.

A further object of my invention is to provide a lock washer which, while being simple in construction, can be made and sold very cheaply and is also more durable, effective and efficient than the ordinary types of washers. These results are due to my novel construction in which the locking points are made of such strength, resiliency and tension to enable them to dig or bite into the work piece or other member clamped against them under screw pressure, while the raised portions help prevent complete flattening out of the locking points by an over-adjustment of the threaded member.

Still another object of my invention is to provide a washer that remains effective even on expansion of the space in which it is received. Such expansion has been known to occur at high temperatures or by the working of the head of a bolt or stud into the adjacent piece under vibration, to an extent sufficient to loosen the washer. The washer according to my invention has sufficient tension to take up such expansion and retain the locking elements in active position.

Another object of my invention is to provide a lock washer which is non-entangling in a mass. A mass of washers usually becomes tangled at the locking points or at the split, if of the split type. In my invention the washer is made uniform and the overlapping of the locking points is initially so slight that they cannot tangle. If the washer is of the split type, for which my invention also provides, the washer is made uniform and the gap at the split is too small to permit another washer to enter therein and tangle therewith.

A still further object of my invention is to provide a lock washer having locking points at the inner or outer circumference or at both circumferences, or between the circumferences. The invention is also adaptable for use in a counter recess receiving a flat head screw. In all of these embodiments, the washer is operative with either right or left-hand threads, as set forth above.

The invention is fully disclosed by way of example in the following description and the accompanying drawings, in which.

Figures 4, 5, 6:
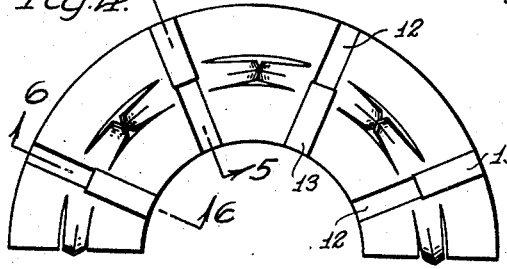
Figure 4 is a fragmentary plan view of a modification.
Figure 7:
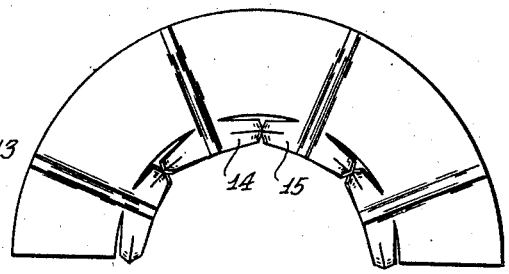
Figure 8:
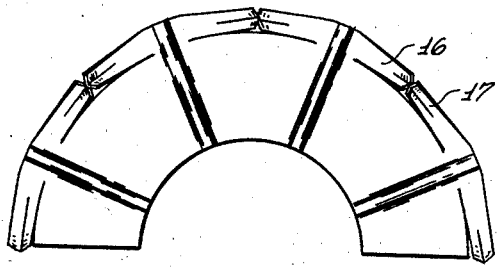
Figure 9:
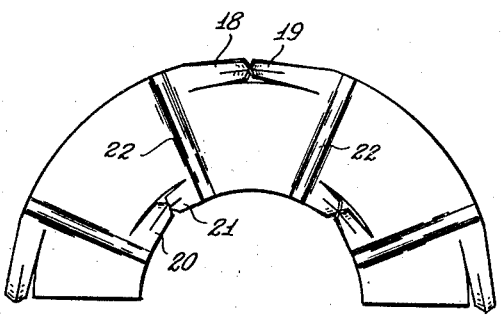

Figures 5 and 6 are sections on the line 5—5 and 6—6 respectively of Figure 4;

Figure 7 is a fragmentary plan view of another modification;

Figures 8 and 9 are fragmentary plan views of additional modifications;

Figure 10 is a fragmentary plan view of another embodiment;

Figures 11 and 12 are sections on the lines 11—11 and 12—12 respectively of Figure 10;

Figure 13 is a fragmentary plan view of another modification;

Figures 14 and 15 are sections on the lines 14—14 and 15—15 respectively of Figure 13;

Figure 16 is a plan view of still another modification;

Figures 17 and 18 are sections on the lines 17—17 and 18—18 respectively of Figure 16;

Figure 19 is a fragmentary plan view of still another embodiment;

Figures 20 and 21 are sections on the lines 20—20 and 21—21 respectively of Figure 19;

Figure 22 is a fragmentary plan view of another modification;

Figures 23 and 24 are sections on the lines 23—23 and 24—24 respectively of Figure 22;

Figure 25 is a fragmentary plan view of another embodiment;

Figures 26 and 27 are sections on the lines 26—26 and 27—27 respectively of Figure 25;

Figure 28 is a fragmentary plan view of another embodiment after the first operation;

Figure 29 is a fragmentary plan view of the finished washer;

Figures 30 and 31 are sections on the lines 30—30 and 31—31 respectively of Figure 29;

Figure 32 is a fragmentary plan view of another modification;

Figure 33 is a section on the line 33—33 of Figure 32;

Figure 34 is a fragmentary plan view of another modification;

Figure 35 is a section on the line 35—35 of Figure 34;

Figure 36 is a fragmentary plan view of another embodiment;

Figure 37 is a section on the line 37—37 of Figure 36;

Figure 38 is a fragmentary plan view of another modification;

Figure 39 is a fragmentary plan view of another embodiment after the first operation thereon;

Figure 40 is a fragmentary plan view of the finished washer;

Figures 41 and 42 are sections on the lines 41—41 and 42—42 respectively of Figure 40;

Figure 43 is a fragmentary plan view of another modification;

Figure 44 is a section on the line 44—44 of Figure 43;

Figure 45 is a fragmentary plan view of another modification after the first operation;

Figure 46 is a fragmentary plan view of the finished washer;

Figure 47 is a section on the line 47—47 of Figure 46;

Figures 48 and 49 are fragmentary plan views of further modifications after the first operation thereon;

Figure 50 is a fragmentary plan view of a split washer;

Figure 51 is a plan view of the blank for a different style of a split washer;

Figure 52 is a vertical section illustrating the use of the washer in conical seats;

Figure 53 is a section on the line 53—53 of Figure 52;

Figure 54 is an elevation of a twisted or corrugated washer;

Figure 55 is an elevation, partly in section, illustrating the digging action of the locking points;

Figure 56 is a section on the line 56—56 of Figure 50;

Figure 57 is a section of a double handed washer according to the invention;

Figure 58 is a fragmentary plan view of a modified form of split washer, and

Figure 59 is a section on the line 59—59 of Figure 58.

Reference to these views will now be made by use of like characters that are employed to designate corresponding parts throughout.

Figure 1:
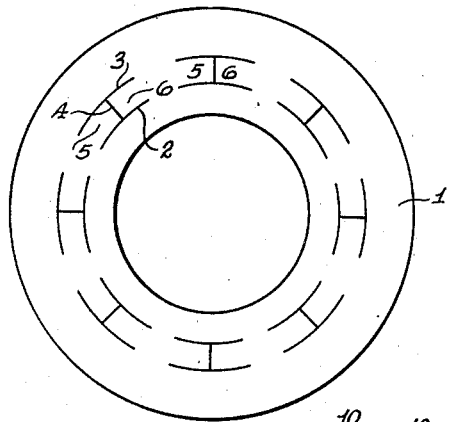
Figure 1 is a plan view of the washer blank after the first operation thereon.
Figure 2:
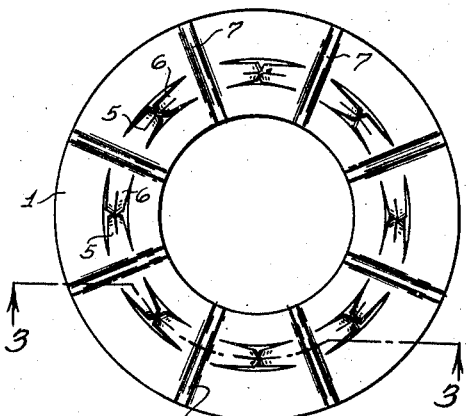
Figure 2 is a plan view of the finished washer.
Figure 3:
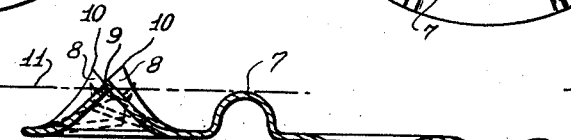
Figure 3 is a section on the line 3—3 of Figure 2, also illustrating in dash lines the condition of the washer when compressed.

In Figures 1, 2 and 3 is shown a washer having a body 1 of annular form. The initial operation, which may also be the blank forming operation, forms two series of relatively long arcuate slits 2 and 3 on circles preferably concentric with the body or blank 1. It will be seen that the slits are arranged in pairs, each such pair being disposed substantially within a sector of the circle. The arcuate strip of metal defined by each pair of slits is bisected by a radial line 4 forming a pair of fingers 5 and 6 at the sides thereof. These fingers lie between the circumferences of the washer, but may be positioned on either circumference or on both, as described below and shown in the drawings.

After this operation on the metal, the blank thus formed is subjected to suitable dies which may be comprised in a series of progressive dies for the complete operation, according to methods well known in the art. These dies form radial ridges or raised portions 7 between the pairs of slits 2 and 3. This operation tends to shrink the blank circumferentially and to crowd adjacent fingers 5 and 6 together. However, the fingers are bent outward from the plane of the blank, adjacent pairs being struck out in opposite directions as shown in Figure 3, and the major length of each finger being concaved transversely and away from the plane of the blank, as indicated by the numeral 8 in Figure 3.

In forming the concavity in the fingers or tongues, the latter become slightly stretched. This effect, together with the shrinking of the washer in forming the ridges, as previously set forth, produces the overlapping of adjacent and oppositely directed fingers or tongues in any of the washer designs shown herein. The stretching of the fingers or tongues and the shrinkage of the blank are so slight as to be hardly perceptible, yet are sufficient to bring about the desired overlapping.

The fingers 5 and 6 are bent at an angle of approximately 45 degrees to the plane of the blank and extend considerably beyond the crowns of the adjacent ridges 7. One finger of each pair slightly overlaps the free end of the complementary finger, as indicated by the numeral 9 in Figure 3. The free points 10 of each pair lie in the same plane parallel to the body of the washer by causing the angle of one or both of the fingers to vary slightly from 45 degrees, the extent of the overlap being approximately the thickness of the metal.

The dot and dash lines 11 represent the surfaces between which the washer is compressed in use. One of these may be on a work piece and the other on a head of screw, bolt, nut or stud. The compression increases the overlap of one finger on the other, as shown in dotted lines in Figure 3, and the forefinger of all the fingers towards the general plane of the washer. At the same time, the points 10 bite or dig into the surfaces 11 in the manner well known in lock washer practice. The compression, however, is arrested when the surfaces 11 engage the ridges 7 so that the washer is not completely flattened and rendered useless. Also, one member of each pair of fingers is given support by the finger which it overlaps, thereby preventing further resistance to flattening out.

As the nut or other threaded member tends to turn loose in one direction or the other, such turning will be resisted either by the fingers 5 or the fingers 6, according to the direction of the thread. This is to be distinguished from the action of the ordinary lock washer in which all the fingers slope in the same direction from the body of the washer, in which case they resist the loosening of a right-hand threaded member but are merely overridden by the loosening of a left-hand threaded member.

Figures 4, 5, and 6 show a construction wherein each of the radial ridges protrudes at both surfaces of the washer. The ridges are of a stepped construction, with one-half of each stamped downward at 12 and the other end upward at 13. Preferably, alternate ridges have the outer half of their length pressed upward, and the remaining or intervening ridges have their inner half pressed upward, as may be seen in Figure 4 and by a comparison of Figures 5 and 6.

In Figure 7 the locking fingers 14 and 15 are formed in the inner periphery of the blank, rather than intermediately as in Figure 2. In Figure 8 the fingers 16 and 17 are formed at the outer periphery. Figure 9 shows alternate pairs of fingers 18 and 19 on the outer periphery and the intervening pairs 20 and 21 on the inner periphery. In any of the washers shown in Figures 7, 8 and 9, the radial ridges 22 may be stepped as in Figure 4, if desired.

Figure 10 shows a washer with tongues 23 and 24 formed as in Figure 1. Each radial ridge, however, is replaced by a radial row of three dents or nubs 25. In alternate rows, the end nubs are stamped upward and the intermediate nubs downward, and in the intervening rows the ends nubs are stamped downward and the middle nubs upward, as shown in Figures 11 and 12 respectively. A similar arrangement is shown in Figures 13, 14 and 15 with the exception that in each row all the nubs are stamped in one direction. In alternate rows the nubs are upward as in Figure 14, and in the intervening rows they are downward as in Figure 15.

The washer shown in Figure 16 is similar to that in Figure 10 except that the nubs 27 are square rather than round. The direction thereof, as shown in Figures 17 and 18, is the same as in Figures 11 and 12. Figure 19 also shows square nubs 28 having one direction in any given row but reversed in direction from each row to the next, as illustrated in Figures 20 and 21.

Figures 22, 23 and 24 resemble Figures 16, 17 and 18 in the arrangement and direction of the nubs 29 except that the latter are diamond shaped. Similarly, in Figures 25, 26, 27 the nubs 30 are diamond shaped but have the same direction and relation as the Figures 19, 20 and 21.

In the modification shown in Figures 28-31, the blank 31 is formed with pairs of fingers 32 and 33, the members of each pair being disposed at different distances from the center and overlapping laterally at their free ends, as shown more clearly in Figure 29. By a subsequent operation the fingers are stamped out in pairs on opposite sides of the blank and are concaved in the direction away from the blank as indicated by the numeral 34 and fully described in connection with Figure 3. At the same time, the fingers of each pair are slightly displaced towards each other to overlap at their tips as indicated by the numeral 35 in Figure 30 and substantially as described in connection with Figure 3. The bending operation also forms the locking points 36 at both sides of the blank. It will be understood that in any of the constructions described, the dies may be so formed as to stretch the metal for the desired overlapping of the fingers. The protruding portions to resist flattening out are in the form of rectangular nubs 37 at both circumferences, with successive nubs preferably alternating in direction as shown in Figure 31.

Figures 32-35 have a locking finger construction resembling that of Figures 28-30. In Figures 32 and 33 the nubs 38 are circular, and Figures 34 and 35 show square nubs 39. Figures 36 and 37 show a similar construction with the nubs 40 having a diamond shape. In these three forms the nubs alternate in direction as may be seen in Figures 33, 35 and 37.

Figure 38 illustrates fingers 41 stamped out as in Figure 29. However, they are given a slight twist at the root 42 in addition to the distortions described in connection with Figure 29. The outer fingers are twisted outwardly and the inner fingers inwardly, so that the overlap is less than in Figure 29. This additional twist imparts additional spring tension to the fingers.

In Figures 39-42 the locking fingers terminate at the radial ridges 43. The blank is slit at 44 in a manner to form fingers 45 at the outer circumference, and the ridges 43 occur between the pairs of fingers. The ends of the fingers are made angular at 46 in the manner already described, with the two such free ends occurring at the convex side of each ridge, it being seen that successive ridges alternate on opposite sides of the blank, as illustrated in Figures 41 and 42. Also, the fingers are bent concavely transversely or from side to side, as illustrated in Figure 42. In Figure 43 the radial ridges are stepped at 47 as described in connection with Figure 4 and further illustrated in Figure 44. The circumferential slits are extended at 48 beyond the end or radial slits to permit the edges of the ridges, at their outer ends, to be extended beyond the plane of the washer in the direction of bending, forming tongues, as indicated by the numeral 49 in Figures 41 and 42. As in Figures 7, 8 and 9, these tongues may be on either circumference or on both.

Figures 45-49 illustrate washers with the locking fingers at the outer circumference and shorter than those previously described. The blank shown in Figure 45 is first formed with short radial slits 50 extending from the outer circumference with a short circumferential slit 51 at the inner end of each. The next operation forms radial ridges 52 between the prolongations of the radial slits, extending between the circumferences of the blank and forming a pair of locking fingers 53 at the outer end of each ridge, as shown in Figure 47. This figure also illustrates that successive ridges are curved in opposite directions. When the washer is compressed, the tongues 53 engage and overlap each other at 53'.

Modifications of this construction are shown in Figures 48 and 49. In the former case, the blank is formed with short radial slits 54 extending from the outer circumference, and at the inner end of each such slit, a rectangular opening 55 is stamped out. In Figure 49 the corresponding openings 56 are oval. In both these figures it will be understood that the subsequent treatment is as described in connection with Figures 46 and 47. These fingers may be on either circumference or on both, as in Figures 7, 8 and 9.

Figures 50 and 51 illustrate the radial splitting of the washer if desired. In Figure 50 is shown a blank 60 suitably slit at 61 for the formation of locking fingers 62 between the two circumferences. Between the pairs of fingers are formed radial ridges 63. The split 64 can conveniently be formed as an unbroken straight line extending between the circumferences and between the free ends of a pair of fingers. In Figure 51 the blank 65 is slit at 66 in substantially the manner described with reference to Figure 29 to form off-set fingers 67 and 68 having their free ends overlapping each other. The split 69 of the washer is radially disposed as a broken line having two parts extended respectively from the free ends of a pair of fingers, or may occupy any other suitable position.

The split in the washer increases the spring tension and resiliency thereof and thus improves the locking effect. The split also prevents breaking of the washer when made heavier for extra heavy duty, although my washers are suitable for both light and heavy duty. The split may be plain as in Figures 50 and 51, or reversed for both right and left-hand threads, as will presently be described.

Any of the washers described herein may be given a conical shape for use in a conical seat 70 receiving a flat head screw 71, as shown in Figure 52. The particular washer 72 here employed is similar to that illustrated in Figure 2, although any of the previously described forms may be so shaped. It will be seen in Figure 53 that the locking fingers 73 extend into the seat 70 and the head 71.

Any of the washers herein described may be given a wavy or corrugated shape, as shown by the washer 74 in Figure 54. The locking fingers 75 extending from both surfaces of the blank and are arranged in pairs, the members thereof extending in opposite directions, substantially as and for the purpose described in connection with Figure 3.

Figure 55 illustrates the action of a washer between a work piece 76 and the head 77 of a bolt, stud or the like, or a nut. Although the illustrated washer 78 is of the type shown in Figure 46, it is merely illustrative of the effect produced by any of my washers herein described. As the member 77 is initially tightened, the points of the locking fingers or tongues 79 penetrate to some extent into the members 76 and 77 as shown at the shaded portions. As the member 77 is further tightened, the locking points dig deeper into the metal and their angle is reduced from approximately 45 degrees to approximately 35 degrees. These angular relations apply to all of the washers shown. At the same time, the fingers or tongues at one surface of the washer body come into contact with those at the other surface. The complete flattening out of the washer, which would destroy its effectiveness is prevented by the provision of ridges or other protuberances as previously described, and the overlapping of the fingers or tongues.

Figure 56 illustrates a fragmentary section of a washer 80 with locking fingers 81 struck up from one surface in the same direction of inclination and similar locking fingers 82 struck out at the other surface in apparently the opposite direction but actually in the same direction, with reference to the rotary movement of clamping members, as the fingers 81. All of the fingers are concaved as designated by the numeral 83 and previously described. This construction involves that principle of the invention whereby two locking points are provided on each locking finger or tongue. However, the reversibility of the washer, or its usefulness for both right and left-hand threads, is lacking. If the loosening direction of the clamping members is from the free end of each finger towards its root at the body of the washer, the washer will hold; but if the loosening direction is opposite, as when an opposite thread is used, the clamping members are not resisted but will merely ride over the locking fingers the latter offering no resistance to rotation in that direction.

In contradistinction, Figure 57 illustrates another washer embodying the feature of reversibility, or adaptability to both right and left-hand threaded members. From the body 85 of the washer are struck locking fingers 86 extending angularly in opposite directions at either side of the washer. Thus, the loosening movement, while unresisted by the locking fingers extending in a given direction will be resisted by those extending in the opposite direction, and this is true regardless of the direction of the thread, since oppositely directed fingers are provided. It will be understood in this connection that resistance to rotation is prevented in the direction from the free end of any locking finger towards its root. The body of the washer is suitably provided with ridges 87 or other protuberances to resist excessive flattening. Also, the free ends of the locking fingers are concaved at 88 to provide two locking points on each finger.

In the construction shown in Figures 58 and 59, the locking fingers are formed in overlapping pairs 90 as previously described, and the blank is split at 91 along a radial line. At one side of the fingers the abutting ends of the split metal are bent in opposite directions, that is, one end 92 is bent upwardly and the other end 93 downwardly. At the other side of the fingers, the abutting ends are also bent oppositely to each other and respectively opposite to the adjacent ends 92 and 93, as indicated by the shading. In other words, the end 94 is bent downward and opposite to the adjacent end 92, and the abutting end 95 is bent upward and opposite to the adjacent end 93.

In this construction, the split itself provides locking members extending in opposite directions on each side of the washer, which is therefore suitable for both right-hand and left-hand threads by virtue of this split along and even without the overlapping fingers 90. The latter are, however, preferably provided for their additional locking effect and resistance to crushing, as previously explained, but the invention contemplates a lock washer for certain purposes provided with the split portion bent as described and not necessarily including additional locking points.

Where adjacent locking fingers are overlapped, as in Figures 3 and 30 for example, or otherwise extended, this effect is produced by one or both of two causes. One is the formation of radial ridges or other bends which reduces the average circumference and draws the fingers together, and the other is the shaping of the fingers in the dies and the bending thereof, which necessarily stretches the fingers lengthwise. This stretching is hardly visible to the naked eye but is nevertheless sufficient to provide the desired overlap, which is initially very small.

The invention is not limited to the precise constructions shown. Details of construction illustrated in certain embodiments may readily be adapted to other embodiments, such as the stepped ridges, the shapes of the protuberances and the relative location and shape of the locking fingers. Also, any of the washer designs can be split as suggested in Figures 50, 51, 58, or may have its body bent to occupy several planes in any desired configuration, Figure 54 illustrating merely one example. Further, the number of locking fingers and raised portions on any given washer design may be varied at will, according to requirements.

It is to be noted that my locking fingers or tongues are resilient and capable of exerting pressure when under locking pressure, for the purpose of digging into and retaining the work pieces. However, the fingers or tongues are rigid at their concave free ends so that these end portions are not destroyed by the pressure of the work pieces thereon. The invention thereby provides a novel form of locking finger or tongue having the advantages of providing two locking points and being rigid at these points, while sufficiently resilient at some other portion thereof for the purpose described.

Although specific embodiments of the invention have been illustrated and described, it will be understood that various alterations in the details of construction may be made without departing from the scope of the invention, as indicated by the appended claims.

What I claim is:

1. A lock washer suitable for right-hand and left-hand threads, comprising a body having upper and lower surfaces, locking elements extending angularly from both surfaces of said body, the elements at the upper surface being inclined in opposite directions to the general plane of said body with reference to circular movement in a given direction around the center of said body, and the elements at the lower surface being likewise inclined in opposite directions to the general plane of said body with reference to circular movement in a given direction around the center of said body adjacent converging elements being so spaced initially as to present at least one locking point each when compressed in use.

2. A lock washer suitable for right-hand and left-hand threads, comprising a substantially circular body having upper and lower surfaces, locking elements extending angularly from both surfaces of said body, the elements at the upper surface being inclined in opposite directions to the general plane of said body with reference to circular movement in a given direction around the center of said body, and the elements at the lower surface being likewise inclined in opposite directions to the general plane of said body with reference to circular movement in a given direction around the center of said body, said elements being concave longitudinally and across their free ends to provide two locking points to each such end.

3. A lock washer suitable for right-hand and left-hand threads, comprising a body having upper and lower surfaces, locking elements extending angularly from both surfaces of said body, the elements at the upper surface being inclined in opposite directions to the general plane of said body, and the elements at the lower surface being likewise inclined in opposite directions to the general plane of said body, oppositely directed elements overlapping one another at their free ends.

4. A lock washer suitable for right-hand and left-hand threads, comprising a body, locking elements extending angularly from both surfaces of said body, the elements at each surface being inclined in opposite directions, said elements being concave at their free ends to provide two locking points at each such end, oppositely directed elements overlapping one another at their free ends, the four locking points of said overlapped ends being substantially in one plane.

5. A lock washer suitable for right-hand and left-hand threads, comprising a body, locking elements extending angularly from both surfaces of said body, the elements at each surface being inclined in opposite directions, said elements being concave at their free ends to provide two locking points at each such end, all of said locking points at either surface of said body being substantially in one plane.

6. A lock washer suitable for right-hand and left-hand threads, comprising a body, locking elements extending angularly from both surfaces of said body within an annulus of said body, the elements at each surface being inclined in opposite directions to one another, said body being formed inside and outside of said annulus with protuberances extending therefrom a slightly smaller distance than said elements.

7. A lock washer suitable for right-hand and left-hand threads, comprising a body, locking elements extending angularly from both surfaces of said body within an annulus of said body, the elements at each surface being inclined in opposite directions to one another, said body being formed inside and outside of said annulus on both surfaces with protuberances extending therefrom a slightly smaller distance than said elements.

8. A lock washer suitable for right-hand and left-hand threads, comprising a body, locking elements extending angularly from both surfaces of said body within an annulus of said body, the elements at each surface being inclined in opposite directions to one another, said body being formed inside and outside of said annulus with radial ridges extending therefrom a slightly smaller distance than said elements.

9. A lock washer suitable for right-hand and left-hand threads, comprising a body, locking elements extending angularly from both surfaces of said body within an annulus of said body, the elements at each surface being inclined in opposite directions to one another, said body being formed inside and outside of said annulus on both surfaces with radial ridges extending therefrom a slightly smaller distance than said elements.

10. A lock washer suitable for right-hand and left-hand threads, comprising a body, locking elements extending angularly from both surfaces of said body within an annulus of said body, the elements at each surface being inclined in opposite directions to one another, said body being formed inside and outside of said annulus with stepped ridges extending from both surfaces thereof, a slightly smaller distance than said elements.

11. A lock washer suitable for right-hand and left-hand threads, comprising a substantially circular body, locking elements extending angularly from both surfaces of said body, the elements at each surface being inclined in opposite directions to one another, the elements extending in a given direction being displaced radially from those extending in the opposite direction and slightly overlapping the latter at the free ends.

12. A lock washer suitable for right-hand and left-hand threads, comprising a body, locking elements extending angularly from both surfaces of said body, the elements at each surface being inclined in opposite directions, said elements being concave at their free ends to provide two locking points at each such end, the overlapped elements being at equal distances from the center of said body.

13. A non-entangling washer comprising a body, locking elements extending angularly from said body in opposite directions, adjacent elements slightly overlapping each other at their free ends, said body being radially split and bent at the split, the distance between the edges at the split being less than the thickness of said body.

14. A lock washer suitable for right-hand and left-hand threads, comprising a body split radially and slit circumferentially across the split, forming four free ends, the ends at one side of the slit being bent in mutually opposite directions, and the ends at the other side of the slit being likewise bent in opposite directions and respectively opposite to the adjacent ends at the first side of the slit.

15. A lock washer suitable for right-hand and left-hand threads, comprising an annular body having upper and lower surfaces, locking elements extending angularly from both surfaces of said body, the elements at the upper surface being inclined in opposite directions to the general plane of said body, and the elements at the lower surface being likewise inclined in opposite directions to the general plane of said body, said elements being confined in an annular area spaced from both circumferences of said body, said body having circumferentially discontinuous indentations both within and outside of said annular area.

16. A lock washer suitable for right-hand and left-hand threads, comprising an annular body having upper and lower surfaces, locking elements extending angularly from both surfaces of said body, the elements at the upper surface being inclined in opposite directions to the general plane of said body with reference to circular movement in a given direction around the center of said body, and the elements at the lower surface being likewise inclined in opposite directions to the general plane of said body with reference to circular movement in a given direction around the center of said body, and radial indentations formed in said body and extending successively to opposite sides of the plane of said body, the body material between indentations having substantial area lying in the original plane of the body and providing substantial spacing between adjacent indentations.

17. A lock washer suitable for right-hand and left-hand threads, comprising an annular body having upper and lower surfaces, locking elements extending angularly from both surfaces of said body, the elements at the upper surface being inclined in opposite directions to the general plane of said body with reference to circular movement in a given direction around the center of said body, and the elements at the lower surface being likewise inclined in opposite directions to the general plane of said body with reference to circular movement in a given direction around the center of said body, and radial indentations formed in said body between elements and extending successively to opposite sides of the plane of said body, the body material between indentations having substantial area lying in the original plane of the body and providing substantial spacing between adjacent indentations.

18. A lock washer suitable for right-hand and left-hand threads, comprising a body having upper and lower surfaces, locking elements extending angularly from both surfaces of said body, the elements at the upper surface being inclined in opposite directions to the general plane of said body and arranged in pairs converging at their free ends, and the elements at the lower surface being likewise inclined in opposite directions to the general plane of said body and arranged in pairs converging at their free ends, adjacent converging elements being so spaced initially as to present at least one locking point each when compressed in use.

19. A lock washer comprising a substantially circular body, locking elements extending therefrom in a circumferential direction, said elements being concave longitudinally and across their free ends to provide two locking points at each such end.

20. A lock washer comprising an annular body having upper and lower surfaces, spaced radial indentations formed in said body and extending successively to opposite sides of the plane of said body, the body material between indentations having substantial flat areas lying in the original plane of the body, and locking elements formed in the areas between said indentations and extending successively to opposite sides of the plane of said body.

DOMNIC V. STELLIN.